United States Patent [19]
Peterson

[11] 3,968,586
[45] July 13, 1976

[54] METHOD FOR FINDING TEMPERATURE ENVIRONMENTS FOR FISH

[75] Inventor: Glen Peterson, Tulsa, Okla.

[73] Assignee: Richard E. Fowlkes, Tulsa, Okla. ; a part interest

[22] Filed: Jan. 6, 1975

[21] Appl. No.: 538,714

Related U.S. Application Data

[62] Division of Ser. No. 334,077, Feb. 20, 1973.

[52] U.S. Cl. .................................................. 43/4.5
[51] Int. Cl.² .................................... A01K 73/02
[58] Field of Search ........................ 43/4, 4.5, 17.1; 73/344, 170 A, 342, 362, 362 AR

[56] References Cited
UNITED STATES PATENTS

| | | | |
|---|---|---|---|
| 1,166,331 | 12/1915 | Davis | 73/342 |
| 2,960,866 | 11/1960 | Pharo et al. | 73/342 |
| 3,295,353 | 1/1967 | Hagen | 73/342 |
| 3,628,274 | 12/1971 | Wojahn | 43/4 |

OTHER PUBLICATIONS

Fisherman's Encyclopedia, Stackpole and Heck, Inc., Harrisburg, Pa., "Limnology," p. 232, copyright 1950.

*Primary Examiner*—Warner H. Camp
*Attorney, Agent, or Firm*—William S. Dorman

[57] ABSTRACT

A method for locating specific varieties of fish comprising the steps of making a plurality of passes with a boat, taking differential temperature measurements beneath the surface of the water during each pass, plotting the differential temperature measurements on a chart, making at least one depth versus temperature measurement for determining the temperature variance of the water with respect to the depth of the water and comparing said charted data with known fish environment references for locating likely position and depths for specific varieties of fish.

3 Claims, 8 Drawing Figures

METHOD FOR FINDING TEMPERATURE ENVIRONMENTS FOR FISH

CROSS-REFERENCE TO RELATED APPLICATION

This application is a division of my co-pending application Ser. No. 334,077, filed on Feb. 20, 1973, and entitled "Method and Means for Finding Temperature Environments for Fish."

BACKGROUND OF THE INVENTION

1. Field of the Invention

This invention relates to a method of prospecting for fish in lakes and oceans, and more particularly, but not by way of limitation, to water differential temperature measurement method for use in conjunction with boats for the express purpose of locating suitable or likely environments for specific varieties of fish.

2. Description of the Prior Art

In recent years it has been established that most species of fish, and perhaps all, have preferred temperature habitats and further need to seek temperatures within a certain tolerance range. The fish will, therefore, seek these preferred temperature areas in lakes and oceans if they can be found and will usually stay in those regions where the preferred temperatures prevail. If adequate food cannot be found in regions of preferred temperature, the fish will temporarily leave to feed and will thereafter return to this most desired habitat.

The temperature of the water in a lake, and within the stratifications of lakes, is often also closely related to the oxygen content of the water. Or to be more precise, we should say that the oxygen content of the water is closely correlated with the temperature of the water. For example, the surface temperature of many lakes gets quite warm during the summer, 80° F. and above, and the oxygen is "boiled out" of the water so to speak, and for this reason many fish avoid such surface layers as much as they do on account of the direct effects of temperature. Oxygen solubility in water is a rather complicated function of temperature.

Recently, electrically operated thermometers have been available whereby fishermen can lower a temperature sensitive probe into the water by means of an electrical conducting cable and detect the temperature at a chosen depth. While the use of these instruments in the hand of expert fishermen greatly improves fishing catches, it is time consuming and most fishermen prefer the more familiar operations of fishing to those of finding the fish and recording temperatures. Fishing thermometers today generally employ a thermistor disposed in a probe at one end of an extremely long two-conductor cable, the other extremity of the cables being connected into one arm of a rather insensitive wheatstone bridge measuring circuit. Power is normally supplied by a single cell 1.5 volt battery connected across the wheatstone bridge terminals. The indicator of the typical fish thermometer is simply an ammeter which is connected across the arms of the said wheatstone bridge and provides a direct temperature readout based on the value of the standard resistor placed in the opposite arm of the wheatstone circuit.

SUMMARY OF THE INVENTION

The present invention contemplates a novel method and means for finding suitable temperature environments for fish by making differential temperature measurements at, or near the surface of lakes and oceans. As stated hereinbefore, it has been established that most species of fish have preferred temperature environments such as those shown by table 1 herein.

TABLE I

| SPECIES | PREFERRED TEMPERATURE | TOLERANCE RANGE OF TEMPERATURES |
|---|---|---|
| Bass, Large Mouth | 70°F. | 65–70°F. |
| Bass, Small Mouth | 67 | 60–70 |
| Bluegills | 72 | 65–80 |
| Crappie | 68 | 60–75 |
| Muskellunge | 65 | 60–80 |
| Perch, Yellow | 68 | 60–75 |
| Pike, Northern | 65 | 60–80 |
| Salmon, Coho | 55 | 45–60 |
| Trout, Brook | 58 | 48–63 |
| Salmon, Chinook | 54 | 50–63 |
| Trout, Brown | 61 | 48–68 |
| Trout, Lake | 41 | 40–45 |
| Trout, Rainbow | 61 | 48–68 |
| Walleye | 60 | 55–70 |

It is also a well-known fact that the temperature of lakes and oceans are not uniform throughout. There is first of all a general variation in temperature with depth. In the summer time in the northern hemisphere, for example, there is generally a decrease in temperature with depth, but during the winter, the surface water may be colder than it is at considerable depths; in fact, the surface may be frozen. Again, throughout all seasons the water of a lake may be stratified as far as temperature is concerned and many lakes have well-defined streams where the temperature differs considerably from the main body of water. Furthermore, the enclosing land masses of a lake may have a considerable influence upon the temperature of a lake, particularly if these land masses are not smooth and have differing thermal conductivities and specific heats, as is the general case.

Since fish have preferred temperatures, as above noted, they will seek these temperatures in lakes and oceans if they can be found and will usually stay in those regions where the preferred temperatures prevail, except possibly when feeding. Temperature is also vital to the reproduction activities of fish, and fish will not usually spawn unless the temperature is exactly right.

The present novel method and means for finding suitable temperature environments for fish is designed and constructed for overcoming the disadvantages of using a simple temperature probe as hereinbefore set forth. The present invention provides for equipping fishing boats with an apparatus, and fishermen with procedures, whereby temperature measurements can be taken at, or near the surface of a large body of water, the said measurements being indicative of temperatures at considerable distances or depths from the said boat or any other point of observation. The apparatus comprises a highly sensitive differential temperature measuring means comprising a pair of thermistor-type probes which are connected to opposite arms of a highly sensitive wheatstone bridge circuit, one of the said thermistors being easily interchangeable with a variable standard resistor thereby also providing the capability of taking direct temperature measurements. Where extreme sensitivity is required, the display unit of the present invention may also be provided with an amplifier for receiving the output from the wheatstone bridge circuit for amplifying the said output before it is displayed. Another feature of the present invention comprises an automatic control system which is connected between the temperature measurement apparatus and the boat steering system whereby a fisherman can troll for fish while his boat is automatically piloted along a chosen temperature isotherm contour.

The present invention also includes a method for locating the specific varieties of fish by making a series of passes with the boat, making differential temperature measurements just beneath the surface of the water in the lake, plotting differential temperature measurements on the chart and comparing the said chart with known temperature environments suitable for certain types of fish.

It has been shown many times by physicists and mathematicians that energy in its manifold forms is often amenable to the same physical concepts and mathematical devices. For example, the solution to a problem in electrostatics is also the solution to a similar problem in heat radiation. Both satisfy Poisson's Equation. Similarly, problems in heat flow and conduction are closely related to problems in electric current flow, as also to problems in magnetic and gravitational fields. This means that much of the rather abundant mass of data produced by physics and geophysics can now be applied to the problems of fishing. The primary difference is that the problems of fishing in lakes are relatively simple as compared with the problems of finding mineral deposits in the very complicated crust of the earth. Most fishing problems are simple two-layer problems for which exact solutions are known and for which tables and graphs have been computed and are available in the technical literature.

DESCRIPTION OF THE DRAWINGS

Other and further advantageous features of the present invention will hereinafter more fully appear in connection with the detailed description of the drawings in which.

DETAILED DESCRIPTION OF THE INVENTION

Figure 1:
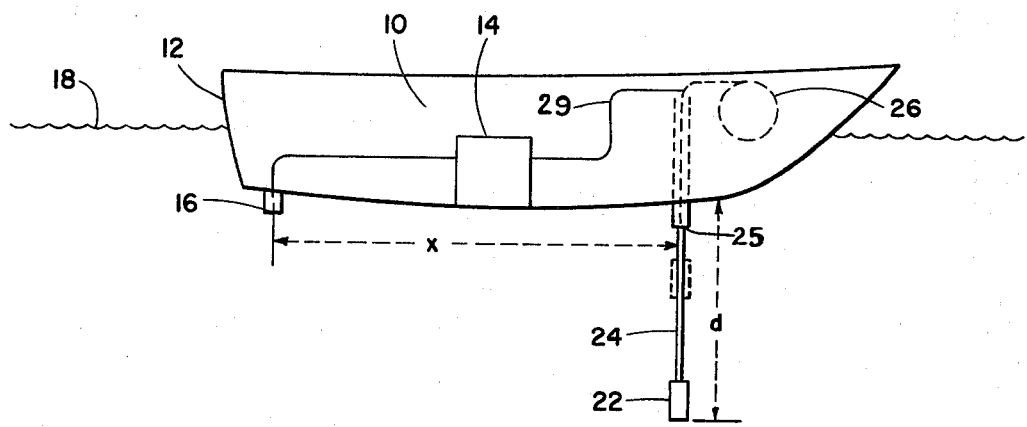
FIG. 1 depicts a boat which is equipped with differential temperature measurement apparatus embodying the invention.

Referring to the drawings in detail reference character 10 generally indicates a water temperature measurement apparatus installed in an ordinary fishing boat 12.

Reference character 14 generally indcates a water temperature measurement apparatus which is installed within the boat 12 in any well known manner. A thermistor probe 16 is secured to the bottom stern portion of the boat 12 beneath the surface of the water generally indicated by reference character 18. A temperature sensitive thermistor 20 (see FIG. 2) is disposed within the probe 16 and exposed to the water 18, the said thermistor 20 being operably connected to the temperature measurement apparatus 14. A second thermistor probe 22 is extendably secured to the bottom bow portion of the boat 12 by means of a cable 24. The cable 24 extends through the bottom portion of the boat 12 through a suitable sealing means 25 and is windably attached to a winch means 26 which is located within the bow portion of the boat 12. A second temperature sensitive thermistor 28 (see FIG. 2) is disposed within the probe 22 in such a manner that it is exposed to the water 18. The thermistor 28 is also operably connected by suitable wiring 29 to the temperature measurement apparatus 14. It is noted that the wiring 29 may be installed in the probe cable 24 or simply may constitute the retractable cable 24.

The temperature measurement apparatus 14 comprises a DC power supply 30, the negative pole thereof being connected to one side of the thermistor 28 through a junction point 32. The said negative output terminal of the battery 30 is also connected directly to one side of the thermistor 20 through the junction point 32 and a single pole double-throw switch SW1. Negative output pole of the power supply 30 is also connectable to one side of a variable resistor R1 through the junction point 30 and the switch SW1. The switch SW1 provides for selecting either the variable resistor R1 or the thermistor 20 to be included in the circuit, but not both simultaneously. A fixed resistor R2 is connected to the opposite side of the thermistor 28 through a junction point 34. The opposite side of the resistor R2 is connected to one side of a variable potentiometer R3, the opposite side of the variable potentiometer R3 being connected to one side of a fixed resistor R4. The opposite end of the fixed resistor R4 is connected to the opposite sides of the thermistor 20 and the variable resistor R1 through a junction point 36. The wiper arm 38 of the variable potentiometer R3 is connected to the positive output terminal of the power supply 30. Reference character 40 of FIG. 2 indicates the point of contact between the wiper arm 38 of the variable potentiometer arm R3 and the resistive element thereof. For purposes of explanation, the resistive element of the resistor R3 between the point of contact 40 of the wiper arm 38 to the resistor R2 will be designated as R3a for ease of explanation, whereas the resistive element between the point of contact 40 of the wiper arm 38 and the fixed resistor R4 will be represented by reference character R3b, again for ease of explanation. An operational amplifier 42 is connected across the bridge to the junction points 34 and 36 for amplification of the voltage difference therebetween. The output of the operational amplifier is connected to a galvanometer type voltage measuring device 44 having a display scale 46 thereon, the center point of the scale 46 representing zero voltage difference between the junction points 34 and 36. One side of the said scale 46 represents the junction point 34 being at a higher voltage potential than the junction point 36 and the opposite side of the scale representing a higher voltage potential at the junction point 36 than at 34.

It is noted that increased sensitivity of the temperature measuring device 14 described above may be obtained by employing a power supply 30 having a voltage about ten times that normally employed in fishing thermometers; for example, 12 volts as compared with 1.5 volts. By utilizing 12 volts instead of 1.5, this apparatus can be connected directly to the 12 volt batteries that are normally found in fishing boats equipped with trolling motors. Also by employing a display meter 44 that reads 0.1 milliampere full scale instead of the usual 1.0 milliampere, additional sensitivity results. Another increase in sensitivity, if required, is provided by means of the operational amplifier 42 to boost the input to the display device 44. Usable sensitivity will also be affected by the following:

1. The ability to balance the bridge circuit through the adjustment of the variable potentiometer R3;
2. The noise levels of the temperature thermistors 20 and 28; and
3. The random thermal noise level of the surface water where temperature observations are being made.

The ability to balance the bridge will be determined by the value of the resistive element of the potentiometer R3 in relation to the amount of resistance of the fixed resistors R2 and R4. If, as a design example, R2 = R4 = 1,000 ohms, R3 = 100 ohms and is a ten-turn pot which can be set with an accuracy of 1 percent of a turn, or 3.6 angular degrees, the circuit can be balanced with an accuracy of one part in ten thousand. Relating this to the temperature thermistor 28 which has a temperature coefficient of about 4 parts per 100 per °C (approximately 8 parts per °F), it is seen that as far as the setability of the variable potentiometer is concerned we could expect to measure temperatures of the order of 1/800°F. This is believed to be far in excess of what will ever be found to be necessary.

In considering of the noise level factor of the temperature thermistors 28 and 20, the noise level of such thermistors is about the same as that of any solid state device (ranging from 40 to 60 Db worse than the noise of thermal agitation, and this is approximately $10^{-11}$ volt per ohm. Thus, if 1,000 ohm thermistors are used, thermal agitation in the said thermistors would develop, at the worst, $10^{-5}$ volts of noise; whereas, with a battery or power source 30 of 10 volts across the wheatstone bridge circuit, the unbalanced current will be of the order of 80 microamps per °F, and the corresponding voltage drop across at 1,000 ohm resistor would be of the order of 0.08 volts. Accordingly, $10^{-5}$ volts of noise represents approximately $1.25 \times 10^{-4}$°F temperature change, and this is considerably less than the smallest change in temperature we would expect to measure.

The random thermal noise level of the surface water where temperature observations are made is probably the limiting one and it, in turn, will be limited by how truly the measured temperature represents the subterranean conditions. This, to a considerable extent, will be fixed by the turbulence of the upper layer of water, considering the action of winds, rain, water skiers, swimmers, fishing boats and motors, etc. Regardless of what this level of interferring noise may turn out to be, there invariably exists a depth below the surface where it no longer is a factor that need be considered. This depth, in most lakes, will not exceed 3 feet in depth, or about half the thickness of a stirred depth of approximately 6 feet. A moderate amount of stirring of the surface is beneficial to this cause; i.e., bringing deep water to the surface is beneficial if not excessive; whereas the random spreading of surface water may be considered detrimental. Thus, if temperature probes 16 and 22 are maintained at depths of 3 feet, or greater, meaningful temperature measurements will always be made. Indeed, boat bottom depths may, by experiment, be found entirely adequate in many situations. This factor will have to be determined experimentally.

In terms of the measurements made by Oceanographers, that the sun's radiation produces from 0.2° to 1.0°F change in surface temperature per day, depending upon the season, location and cloud cover, it is postulated that temperature differences will be of the order of tenths and hundredths of a degree Fahrenheit which is well within the precision of the apparatus 10 described.

Figure 3:
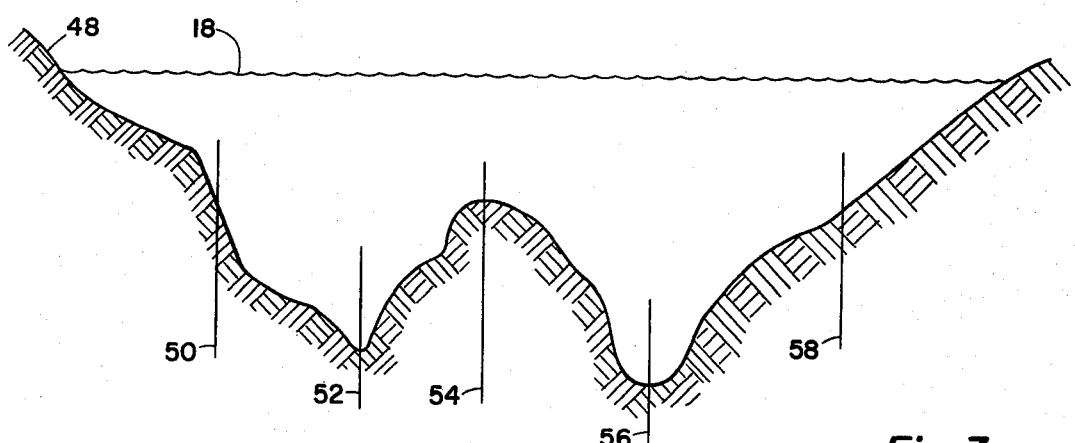
FIG. 3 is a profile sectional view of a body of water having various sudden drop-offs, submerged land mass or hill and various other features found in a typical body of water.
Figure 4:
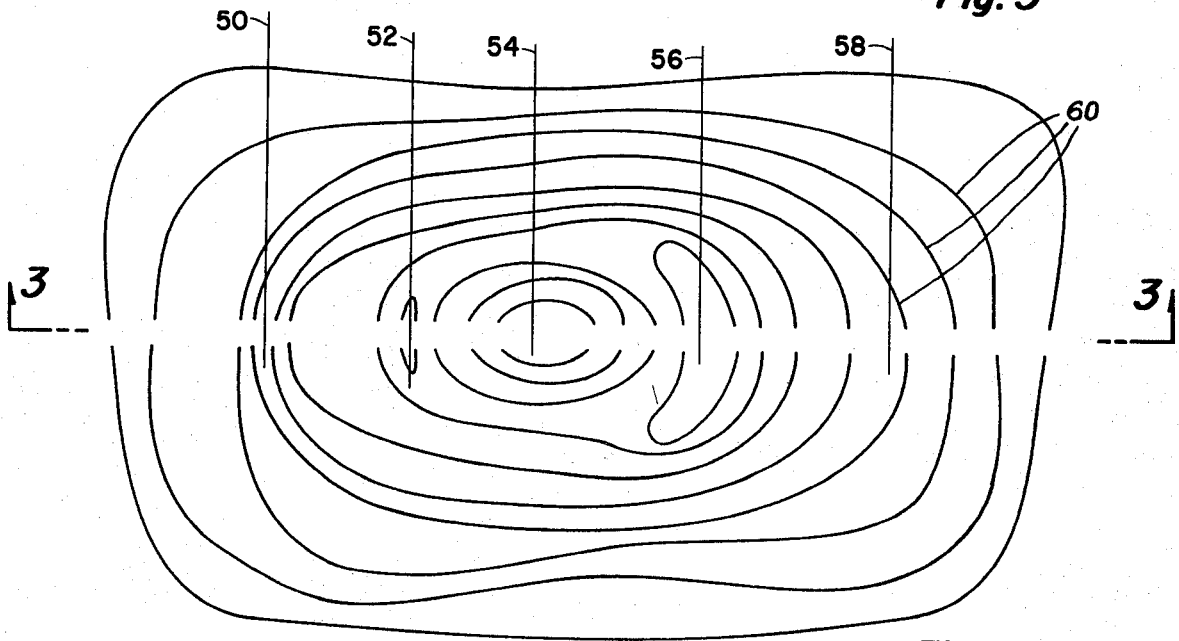
FIG. 4 is a plan view of the body of water of FIG. 3 with isotherm contours shown.

Referring now to FIG. 3, this depicts a sectional profile view of a body of water 18 wherein reference character 48 represents the enclosing land mass. The basin portion of the land mass 48 also has a sudden drop off at reference character 50, a first deep basin area at reference character 52, a submerged land mass or hill at 54, a deeper basin area at 56 and a general sloping area 58 back to the surface of the body of water 18. Another typical condition that occurs in many lakes which is conducive to good fishing is that of a stream of water flowing into the lake which can cause a temperature stratification around that stream of water (not shown). However, for purposes of illustration, that represented in FIGS. 3 and 4 covers a sufficient number of situations found in most lakes to establish a general case. It is pointed out that by no means have all of the manifold situations been covered. Fig. 4 represents a plan view of the body of water of FIG. 3, the profile of FIG. 3 being taken along the broken line 3—3 of FIG. 4. Reference characters 50, 52, 54, 56 and 58 have been located along the line 3—3 of FIG. 4 to show the location in FIG. 4 of the anomalies pointed out in the description of FIG. 3 above. FIG. 4 also depicts a plurality of isotherm contours 60 which indicate typical isotherm contours found at or near the surface of a lake having a basin configured similar to that shown in the profile FIG. 3 during the summer season.

As hereinbefore set forth, the average temperature at the surface of the lake is directly dependent on the depth of the lake at that particular point, the surface temperature normally being higher at the surface than the temperature at depth during the summer and possibly lower at the surface than the temperature at depth during the winter. For purposes of illustration the isotherm contours depicted in FIG. 4 are based on summertime conditions wherein the temperature decreases with depth. Since the temperature of the land masses 48 will not usually conform to the water temperature of the lake, except at the interface of water and land, the difference in temperature will be conducted into the water 18 and hence be reflected in the temperature of the water near the surface of the lake. Generally, the heat conductivity of the adjacent land masses will be poorer than that of the water and the specific heats considerably smaller, although the density of the land will compensate somewhat for the lower specific heats. As a result, during the fall and winter when the water of the lake is cooling off, the land masses will cool at a different rate and present contrasting volumes. The conspicuous condition, however, will always be the varying depths of the water as determined by the land contours. A converse operation takes place during the spring and summer when the water of a lake is warming.

The isothermal contours 60 of FIG. 4 generally describe the overall heating and cooling conditions of a typical lake. A boat 12 equipped with temperature measuring apparatus 10 crossing such a lake 18, will traverse these isothermal contours 60 as indicated by a path taken along the broken line 3—3 of FIG. 4.

It is also pointed out that since water and earth have different thermal conductivities and specific heats, and further due to the seasonal effects of the sun's radiation, the water and earth will virtually never come into static thermal equilibrium. Since the submerged land can only gain or lose heat through the body of water above it, the temperature of this body of water has to be affected; othewise, there is no transmission of heat one way or the other and hence the temperature of the surface from whence the heat goes and comes, must be affected. The lake and subterranean land mass as a whole, gains heat through the radiation of the sun on the lake surface, and the combination loses heat primarily by radiation from the surface of the lake and the evaporation of water which again is a surface phenomenon.

Figure 5:
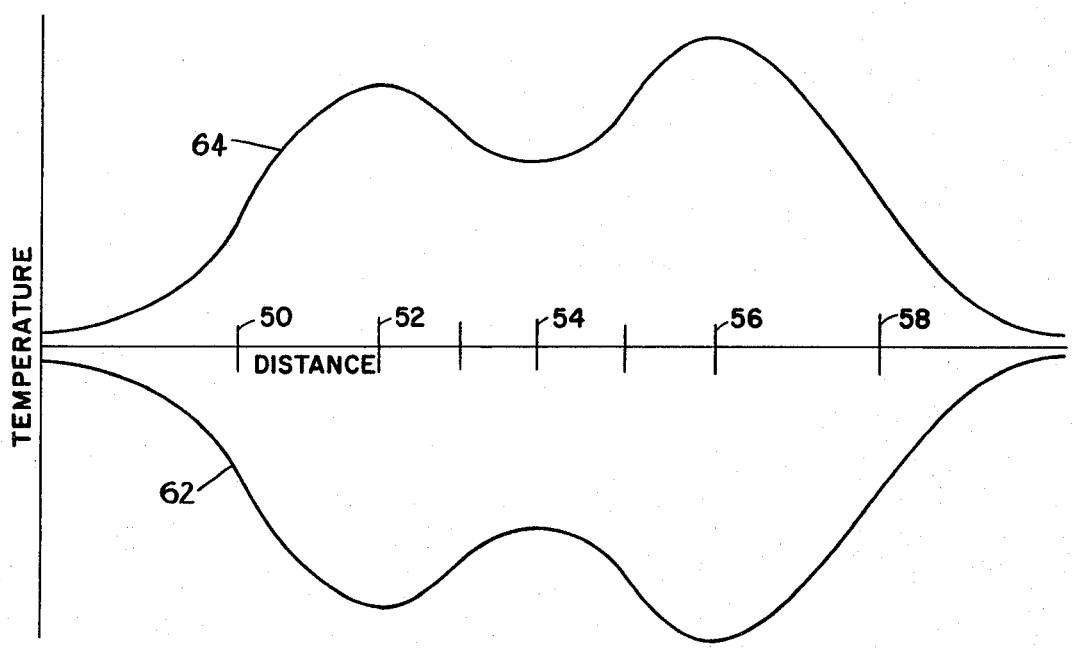
FIG. 5 is a graph of temperature at the surface of the lake taken along the broken line 3—3 of FIG. 4, one curve representing summer-type temperature variations, the other curve representing winter-type temperature situations.

Referring now to FIG. 5, the graph 62 represents summer surface temperature changes with respect to distance or the lake situation shown in FIGS. 3 and 4. Again, the underwater land mass anomalies 50, 52, 54, 56, and 58 are plotted along the distance or abscissa of the chart of FIG. 5 for purposes of illustration. Similarly, the temperature plot 64 represents the condition of the same plot across the body of water of FIGS. 3 and 4 during winter conditions.

Considering now the boat course along the broken line 3—3 of FIG. 4 having temperature probes 22 and 16 located in the bow and stern of the boat 12, respectively, and the meter 44 being connected to read in terms of the temperature of the probe 22 located in the bow of the boat 12. The graph of FIG. 6 would represent the differential temperature (the derivative of the curve 62). It is noted that if one does not know the day of the subterranean land masses along the broken line 3—3 of FIG. 4, he would be obliged to make several passes across the anomalies to find the shortest distances between points of inflection 50, between 52 and 54, between 54 and 56 and at 58. The axis of stratification of anomalies would then lie perpendicular to the shortest trajectory, and the distances between the said points of inflection can then be used to estimate the depth of the colder body of water. In most instances, however, the practical fisherman having located an inviting anomaly will simply use his water thermometer (not shown) to determine the exact depth and temperature of the subterranean mass. This water thermometer, however, can of course be represented by the probe 22 as shown in FIGS. 1 and 2 by simply operating the switch SW1 of FIG. 2 to connect the variable resistor R1 into the circuit and then by lowering the probe 22 having the temperature thermistor 28 located therein measure the temperature directly by means of the meter 44.

Similar measurements can be made with respect to practically any lake structure and the interpretations provided by theoretical expositions, topographical maps and previous experience. With respect to artificially empounded lakes, excellent topographical maps are generally available and can be used as guides.

Figure 2:
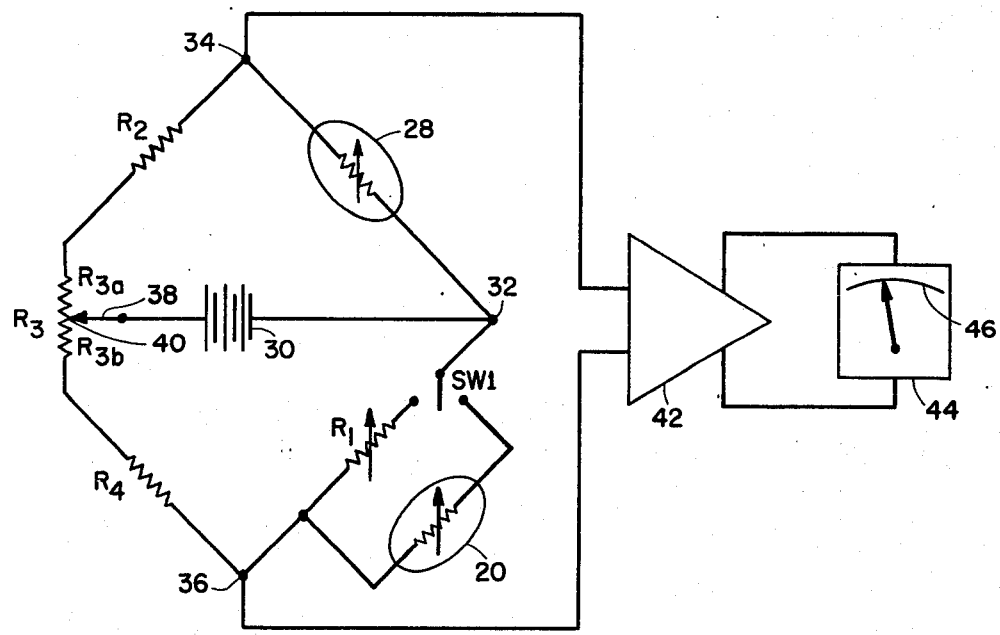
FIG. 2 is a circuit diagram of a basic differential temperature measuring means.

Another mode of operation in deep lakes, for example in Lake Michigan where fishing for Coho Salmon is popular, is that of lowering probe 22 FIG. 1 to some considerable depth in the water, and using resistor R1, FIG. 2 set to a resistance value which represents 55°F, the temperature preferred by Coho Salmon. As the boat moves through the water, and with it probe 22, meter 44 is observed to note when the reading is zero, indicative of the fact that probe 22 is then in 55°F. water.

At this particular location of probe 22, with the boat at standstill the surface temperature of the water can then be measured, either by connecting the fixed probe into the measuring circuit, or by pulling probe 22 back to the surface. The adjustable resistance of the bridge, R1, can then be set to represent this temperature, and the extent of the 55°F sub-surface anomaly more extensively traced, at higher boat speeds, with both temperature probes drawn in close to the boat. High boat speeds obviously are not practical when one temperature probe is extended any great distance due to the risk of breaking the cable, and the fact that the extended probe is pulled toward the surface by the motion of the boat.

Figure 6:
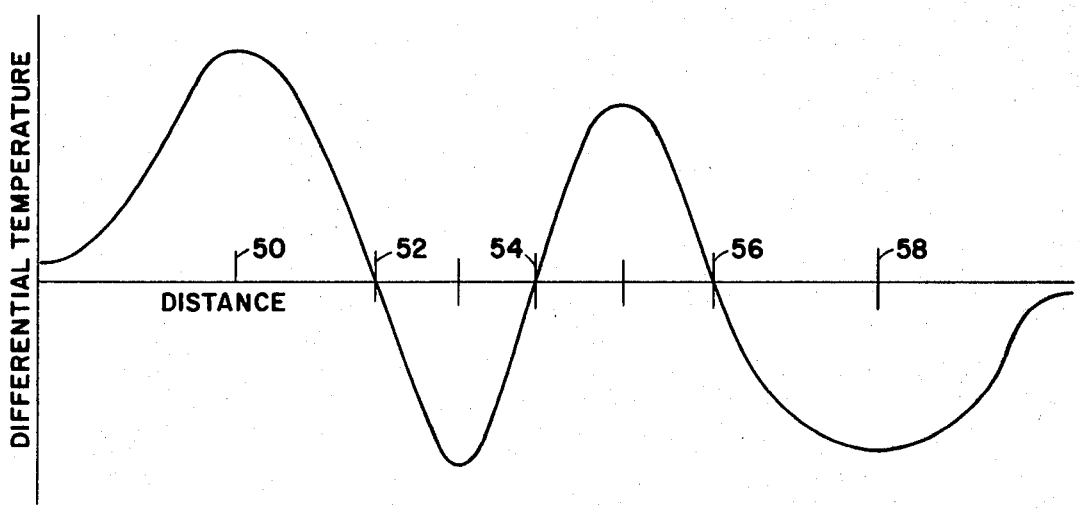
FIG. 6 is a graph depicting the derivative of one of the curves of FIG. 5.

It is clear that by using the temperature measuring apparatus 10 in a differential mode; that is, with the thermistor 20 being connected in the circuit, the meter output will be a differential temperature output as shown in FIG. 6 as opposed to ordinary temperature measurements as shown in the graph 62 of FIG. 5. It is noted that the differential temperature graph at point 50 sharply locates the position of the drop-off 50 on the profile view of FIG. 3 whereas, with a simple temperature plot as shown in FIG. 5 the drop-off at 50 would simply appear as an inflection point in the temperature curve which is rather difficult to locate. The deeper points 52 and 56 and the hills as represented by 54 are also easily spotted on the differential temperature chart at 56 by simply noting the zero points on the said differential temperature curve of FIG. 6. The subterranean hills, such as that of 54, show up readily on the differential temperature chart where the graph crosses the zero line from lower left to upper right and the valleys, as depicted by reference characters 52 and 56, show up as the graph crosses the zero line from upper left to lower right which represents a vast improvement over a simple temperature plot as shown in FIG. 5. It is also easy to determine or locate temperature strata anomalies caused by streams flowing into the lake by using the same method as hereinbefore set forth.

It is to be noted that two or more differential profiles may be taken along any path, such as 3—3 of FIG. 4, with temperature probe 16 fixed in position at one end of the boat, and temperature probe 22 set to a different depth for each profile taken. Knowing the horizontal separation ($x$) of the temperature probes 16 and 22, and the vertical depth ($d$) of the probe 22 in the water, gravitational, electrical and thermal prospecting techniques can be applied to the art of fishing. As noted elsewhere in this disclosure, the mathematics describing electrical, thermal, magnetic, gravitational fields, etc., are basically the same and can be used interchangeably. For example, the mathematics which describes a salt dome, as a gravitational disturbance, can be used to describe a submerged mass of water having a temperature different from its surroundings, providing appropriate changes are made in the variables and constants represented by the mathematical symbols. Thus, making temperature measurements at two separated distances in the surface water surrounding a boat is closely related to making two gravity measurements at the surface of the earth. Similarly, differentially comparing two temperature measurements made by probes, separated by a boat-length, in a two-layered water temperature situation is closely related to electrical conductivity measurements made by two separated electrodes in a two-layered electrically conductive earth. Accordingly, the abundant literature and experience of geophysical exploration can be applied to the art of fishing.

Not only can the methods, experience and literature of geophysical prospecting be applied to the art and science, of fishing, it is also relatively simply in a lake to obtain experimental correlations when temperature anomalies are discovered. As elsewhere noted, once a temperature anomaly has been discovered in fishing waters, the temperature probe 22 can be quickly lowered into the water, at one or two points, and the exact depth to the anomaly measured.

The depth known, and the slant, if it has one, determined by two depth measurements, the area extent of the temperature anomaly can be quickly determined by making additional surface temperature measurements in accordance with the teachings of this invention and the apparatus provided.

By applying the art and science of geophysical prospecting and by making a few relatively simply correlations with depth, good fishing areas can be found and mapped using the methods and apparatus of the present invention.

Figure 7:
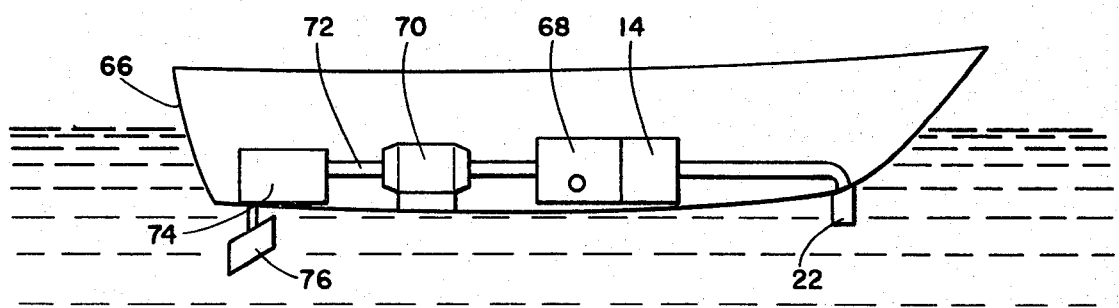
FIG. 7 depicts an elevational section of a boat equipped with an automatic steering control system and temperature measurement apparatus embodying the present invention.

Referring now to FIG. 7, reference character 66 represents a boat equipped with an automatic pilot system utilizing the probe 22 located in the bottom bow portion of the boat 66. In this particular application, the switch SW1 of the bridge circuit of FIG. 2 is switched to connect the variable resistor R1 into the circuit, the thermistor 28 in one arm of the bridge being located within the probe 22. The output of the amplifier 42, in addition to being provided as an input to a meter 44, is also provided as an input to a power amplifier 68. An error voltage of the form shown by the differential temperature graph of FIG. 6 is thereby fed from the bridge circuit 14 into the said amplifier 68 and thence into a reversible DC electric motor 70 having a rotational output shaft 72 thereon. A gear box 74 is operably connected to the motor output shaft 72 for transmitting the rotation provided by the said shaft 72 to operate an ordinary boat rudder means 76. It is noted that any standard automatic control process may be utilized to steer the boat 66 based on the error voltages provided by the differential temperature measurement apparatus 14.

In operation, having found a desirable isothermal contour for fishing, the fisherman may adjust the variable resistor R1 to correspond to the particular desired isotherm contour and the thermistor 28 located in the probe 22 will pick up the temperature at the bow of the boat 66 if the temperature sensed by the thermistor 28 is not equal to the temperature setting represented by the variable resistor R1 then the said bridge circuit 14 will become unbalanced and an electrical error signal is thereby developed and fed into the power amplifier 68. The output of the amplifier 68 will then be fed into the DC motor 80 which will in turn operate the motor shaft 72 which will then turn the rudder 76 through the gear box 74 one way or the other, as required to correct the course of the boat.

The error voltage represented by the differential temperature graph of FIG. 6, having both positive and negative lobes, as determined by the position of the probe 22 in the water with respect to the isothermal contour chosen by the setting of the variable resistor R1, controls both the polarity and the magnitude of the current driving the DC motor 70. This automatic pilot system, in addition to the information above described, requires an additional piece of information; that is, which of the two types of temperature variations occurs and is being followed. Stated another way, to travel the isotherm contour in one direction requires that the higher isotherm contour be to the right and the lower to the left whereas, to follow the same isotherm contour in the opposite direction would require that the higher isotherm contour be to the left and the lower to the right. This piece of information may be readily supplied to the automatic pilot system by a simple switching means which will be hereinafter set forth. Without this switching means, the automatic pilot will turn the boat around until the appropriate situation is found, whereupon the fisherman may find himself trolling in a direction opposite to that intended.

It is also obvious that the rudder means 76 may simply be a trolling motor (not shown), the rotatable shaft of which is being controlled by the gear box 74 to produce the required steering direction.

Figure 8:
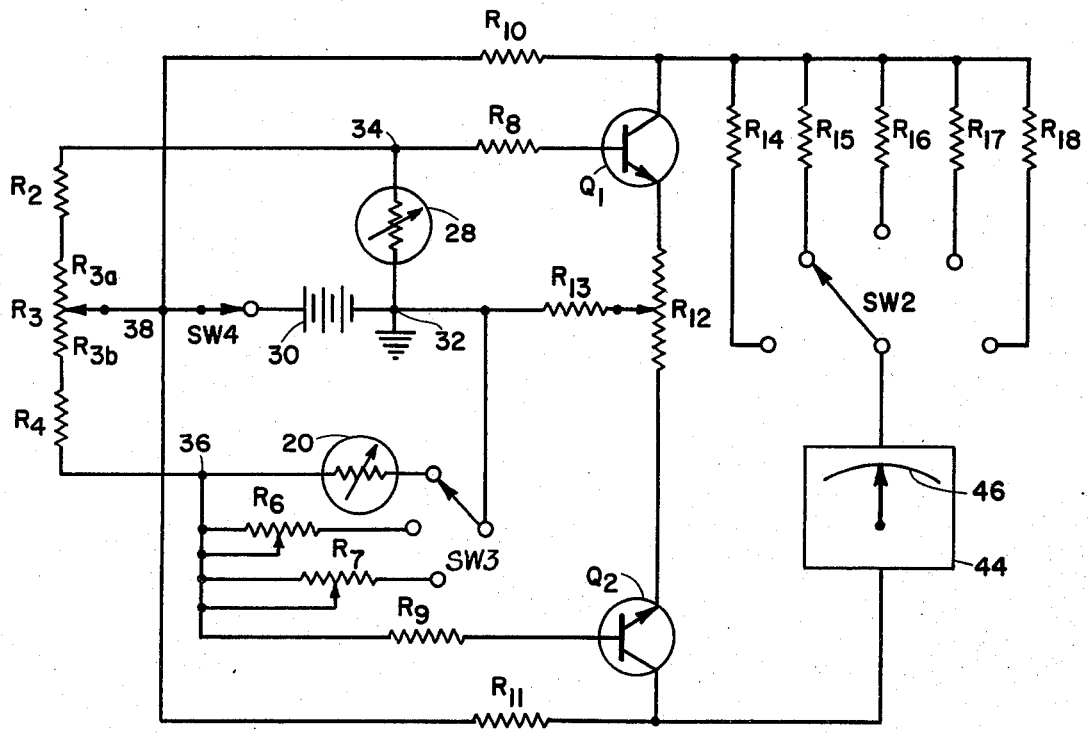
FIG. 8 is a schematic diagram of the preferred embodiment of wheatstone bridge measuring and amplifying circuit utilized in the present invention.

Referring now to FIG. 8, the circuit thereof represents the preferred embodiment of the temperature measurement apparatus wherein, for ease of explanation, the resistors R2 and R4, the potentiometer R3, the power source 30, the thermistors 20 and 28, the metering means 44, and the bridge junction points 32, 34, 36 and 40 are the same elements hereinbefore described in connection with the circuit 14 of FIG. 2. The amplifier 42 of FIG. 2 is represented here by a pair of differentially connected NPN type transistors Q1 and Q2 and a plurality of fixed resistors R8 through R11 and R13 through R18, a potentiometer R12 and a single pole five position switch SW2. The variable resistor R1 of FIG. 2 is represented in the circuit of FIG. 8 by a pair of variable resistors R6 and R7 representing two different ranges of resistance. The switch SW1 of FIG. 2 is represented in the circuit of FIG. 8 by a single pole triple position switch SW3 which provides the capability of selecting either the thermistor 20, the variable resistor R6 or the variable resistor R7 to be included in the wheatstone bridge circuit. A third switch SW4 is connected between the positive output terminal of the power source 30 and the wiper arm 38 of the potentiometer R3 as a simple on-off switch for the circuit.

The output terminals 34 and 36 are connected to the bases of the transistors Q1 and Q2 through the load resistors R8 and R9, respectively, so that very small currents are drawn and the wheatstone bridge operates essentially as a voltage measuring device. The load resistors R10 and R11 are connected to the positive output terminal terminal of the power source 30 through the switch SW4, the opposite ends thereof being connected as load resistors for the collector circuits of the transistors Q1 and Q2 respectively. The potentiometer R12 is connected between the emitters of the transistors Q1 and Q2 whereby the said transistors can be given an initial balance so that the voltage appearing across the meter 44, in the absence of a signal, is zero. The adjustment made by the potentiometer R12 is necessary only once for any pair of transistors. Likewise, the wheatstone bridge balancing adjustment R3 can be once made for any pair of matching thermistors 20 and 28. The load resistor R13 is an additional biasing resistor in the common emitter circuit as may be required for optimum operation.

The variable resistors R6 and R7 are adjustable calibrated resistances used to replace the thermistor 20 when the single probe method of operation is utilized, and departures from chosen isotherm contours are measured. The switching arrangements of SW2 and SW3 will be such that suitable scale ranges for the meter 44 are provided when either the thermistor 20, the variable resistor R6 or the variable resistor R7 are connected into the circuit by means of the switch SW3. The resistor R7 may be of a scale such that the actual temperature sensed by the thermistor 28 may be indicated on the meter 44. In this way, the real temperature of the surface water 18, as well as differential temperatures, may be read. Again, if the thermistor 28 is used in the mode of operation as a simple temperature probe, the temperature of the water at any chosen depth may be exactly measured. By operating the switch SW2 to connect one of the fixed resistors R14 through R18 any one of five different scales may be chosen for the meter 44.

It is also noted that the desired balancing adjustments provided by the potentiometers R3 and R12, in view of the fact that either is capable of nulling the meter 44, can be found by placing a sensitive external volt meter (not shown) across the terminals 34 and 36 to obtain a null on this external meter. With this null thus imposed on the bases of the amplifier transistors Q1 and Q2, R12 is then adjusted to null the meter 44. Once the potentiometers R3 and R12 have been properly set, further adjustment is not required, as previously stated, unless the transistors Q1 and Q2 or the thermistors 20 and 28 are changed.

The meter 44 is preferably a zero-center type of instrument, so that deviations right and left are displayed. Three scales should be provided: one that shows true temperature over the complete range, far left to far right; a second that has a maximum scale reading, each side of the center of "1"; and a third that has a maximum scale reading, each side of the center of "3". Appropriate decimal multipliers may be provided on the switch SW2.

From the foregoing it will be apparent that the present invention provides a method and means for finding temperature environments for fish, the apparatus being particularly designed and constructed for making temperature measurements at substantially any depth within the water, for making differential temperature measurements and for providing automatic control means for steering the boat along any particular isothermal contour.

Whereas the present invention has been described in particular relation to the drawings attached hereto, it should be understood that other and further modifications, apart from those shown or suggested herein, may be made within the spirit and the scope of this invention.

What is claimed is:

1. A method for locating specific varieties of fish comprising the steps of making at least one pass over an area of water with a boat having thereon a pair of longitudinally spaced temperature measuring devices disposed in the water, taking differential temperature measurements immediately beneath the surface of the water during each such pass for determining a temperature variance of the water near the surface thereof as a projection of subsurface temperature variations, making at least one depth versus temperature measurement by lowering one of said temperature measuring devices further beneath the surface of the water for determining the temperature variance of the water with respect to the depth of the water, and comparing the temperature measurements with known fish environment reference data for locating likely positions for specific varieties of fish.

2. A method for locating specific varieties of fish as set forth in claim 2. including the additional steps of making a plurality of said passes, plotting the differential temperature measurements on a chart, correlating said charted differential temperature measurements and said depth versus temperature measurement, and comparing said charted and correlated data with known fish environment reference data for locating likely positions and depths for specific varieties of fish.

3. A method for locating specific varieties of fish as set forth in claim 2 including the additional steps of plotting isotherm contours on the said chart and trolling for fish along the selected isotherm contour and at a depth constituting the most likely habitat for specific varieties of fish.

* * * * *